US012328612B2

(12) United States Patent
Cui et al.

(10) Patent No.: US 12,328,612 B2
(45) Date of Patent: Jun. 10, 2025

(54) MEASUREMENT OBJECTS MERGING FOR NR UNLICENSED SPECTRUMS

(71) Applicant: APPLE INC., Cupertino, CA (US)

(72) Inventors: Jie Cui, Cupertino, CA (US); Yuqin Chen, Beijing (CN); Chunxuan Ye, San Diego, CA (US); Dawei Zhang, Cupertino, CA (US); Hong He, Cupertino, CA (US); Manasa Raghavan, Cupertino, CA (US); Oghenekome Oteri, San Diego, CA (US); Weidong Yang, San Diego, CA (US); Wenshu Zhang, San Diego, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 677 days.

(21) Appl. No.: 17/593,711

(22) PCT Filed: Apr. 13, 2021

(86) PCT No.: PCT/CN2021/086925
§ 371 (c)(1),
(2) Date: Sep. 23, 2021

(87) PCT Pub. No.: WO2022/021941
PCT Pub. Date: Feb. 3, 2022

(65) Prior Publication Data
US 2022/0312248 A1 Sep. 29, 2022

(30) Foreign Application Priority Data
Jul. 29, 2020 (WO) ................ PCT/CN2020/105466

(51) Int. Cl.
H04W 24/10 (2009.01)
H04W 16/14 (2009.01)
(Continued)

(52) U.S. Cl.
CPC .......... *H04W 24/10* (2013.01); *H04W 16/14* (2013.01); *H04W 36/00698* (2023.05);
(Continued)

(58) Field of Classification Search
CPC ..... H04W 24/00; H04W 24/08; H04W 24/10; H04W 74/006; H04W 74/008;
(Continued)

(56) References Cited

U.S. PATENT DOCUMENTS 11,234,152 B2 * 1/2022 Tsuboi ................. H04W 76/16
2018/0220459 A1 8/2018 Park et al.
(Continued)

FOREIGN PATENT DOCUMENTS

CN 107787005 A 3/2018
CN 110475281 A 11/2019
(Continued)

OTHER PUBLICATIONS

Intel Corporation, "On remaining issues for MOs merging," R4-1812135, 3GPP TSG-RAN4 Meeting #88bis, Chengdu, China, Agenda Item 7.11.2.1, Oct. 8-12, 2018, pp. 1-2 (Year: 2018) (Year: 2018).*

(Continued)

Primary Examiner — Omer S Mian
Assistant Examiner — Scott A Schlack
(74) Attorney, Agent, or Firm — Dorsey & Whitney LLP

(57) ABSTRACT

This disclosure describes techniques for NR-U MO merging in EN-DC and NR-DC embodiments, with consideration of additional parameters including different Q values and RSSI Measurement Timing Configuration (RMTC) configurations.

13 Claims, 3 Drawing Sheets

(51) Int. Cl.
    *H04W 36/00*     (2009.01)
    *H04W 36/14*     (2009.01)
    *H04W 76/16*     (2018.01)
    *H04W 88/06*     (2009.01)
    *H04B 17/318*     (2015.01)

(52) U.S. Cl.
    CPC ....... *H04W 36/1446* (2023.05); *H04W 76/16* (2018.02); *H04W 88/06* (2013.01); *H04B 17/318* (2015.01)

(58) Field of Classification Search
    CPC ......... H04W 74/0816; H04W 36/0058; H04W 36/0061; H04W 36/0069; H04W 36/00698; H04W 36/00835; H04W 36/08; H04W 36/30; H04W 36/32; H04W 36/1446; H04W 48/12; H04W 48/16; H04W 48/20; H04W 88/06
    See application file for complete search history.

(56) References Cited

U.S. PATENT DOCUMENTS

| | | | |
|---|---|---|---|
| 2019/0230550 A1 | 7/2019 | Yiu | |
| 2019/0387424 A1* | 12/2019 | Yiu | H04W 24/00 |
| 2020/0052803 A1* | 2/2020 | Deenoo | H04B 17/327 |
| 2022/0183055 A1* | 6/2022 | Rune | H04W 74/0816 |
| 2023/0262600 A1* | 8/2023 | Wallentin | H04W 36/0088 370/311 |
| 2023/0337278 A1* | 10/2023 | Wang | H04L 5/0091 |

FOREIGN PATENT DOCUMENTS

| | | | |
|---|---|---|---|
| CN | 110999375 A | | 4/2020 |
| WO | 2019193125 A1 | | 10/2019 |

OTHER PUBLICATIONS

ETSI TS138.311, V16.1.0 5G; NR; Radio Resource Control (RRC) Protocol Specification (3GPP TS 38.311 Version 16.1.0 Release 16), pages: (Year: 2020) (Year: 2020).*

3GPP TS 38.331, "3rd Generation Partnership Project; Technical Specification Group Radio Access Network; NRÂ.' Radio Resource Control (RRC) protocol specification (Release 16)", V16.1.0, Jul. 2020, 906 pages.

Apple, "On MO merging for NR-U", R4-2009908, 3GPP TSG-RAN4 Meeting #96-e, Online, Agenda Item 7.1.5.11, Aug. 17-28, 2020, 6 pages.

NTT Docomo, Inc., "Enhancements to initial access procedure for NR-U", R1-1912875, 3GPP TSG RAN WG1 #99, Reno, Nevada, USA, Agenda Item 7.2.2.2.2, Nov. 18-22, 2019, 9 pages.

Apple , "CR on UE measurements capability and reporting criteria for NR-U", R4-2006183, 3GPP TSG-RAN4 Meeting #95-e, online, Change Request 38.133 CR0617, current version 16.3.0, May 25-Jun. 5, 2020, 6 pages.

Apple , "CR on UE measurements capability and reporting criteria for NR-U", R4-1913498, 3GPP TSG-RAN4 Meeting #93, Reno, Nevada, Change Request 38.133 CR 0132 Current Version 16.1.0, Nov. 18-22, 2019, 26 pages.

Huawei, Hisilicon , "Discussion on remaining issues on MO merging", R4-1812979, 3GPP TSG-RAN WG4 Meeting #88bis, Chengdu, China, Agenda Item 7.11.2.1, Oct. 8-12, 2018, 3 pages.

Huawei, Hisilicon , "Discussion on the remaining issues on MO merging", R4-1815119, 3GPP TSG-RAN WG4 Meeting #89, Spokane, Washington, Agenda Item 7.11.2.1, Nov. 12-16, 2018, 3 pages.

Intel Corporation , "On remaining issues for MOs merging", R4-1812135, 3GPP TSG-RAN4 Meeting #88bis, Chengdu, China, Agenda Item 7.11.2.1, Oct. 8-12, 2018, 2 pages.

PCT/CN2021/086925 , International Search Report and Written Opinion, Jul. 9, 2021, 9 pages.

* cited by examiner

MEASUREMENT OBJECTS MERGING FOR NR UNLICENSED SPECTRUMS

TECHNICAL FIELD

This application relates generally to wireless communication systems including configuring measurement objects.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node. NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF TI-IE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
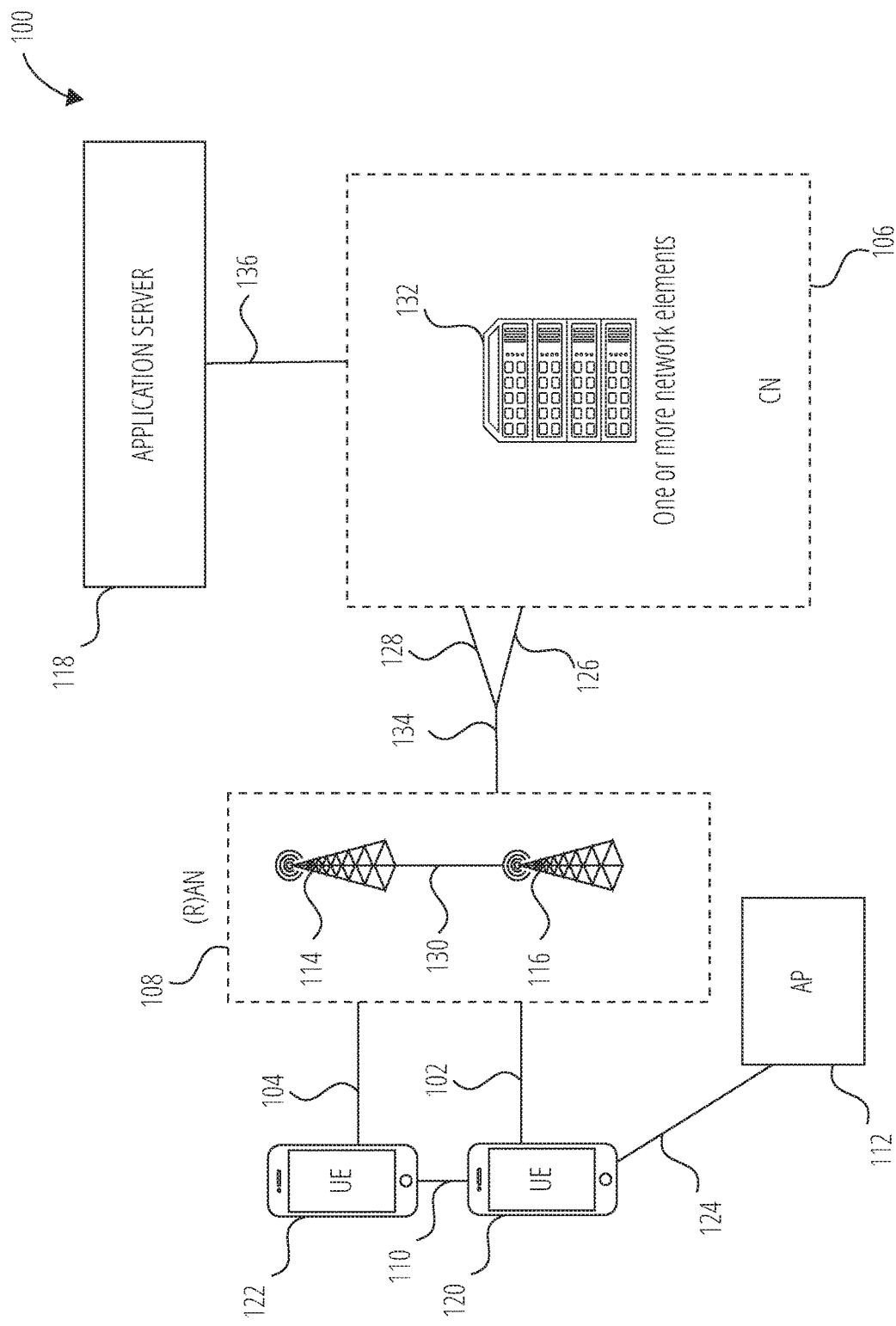
FIG. 1 illustrates a system in accordance with one embodiment.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems. IEEE 802.16 protocols (e.g., WMAN, WiMAX, etc.), or the like.

As shown by FIG. 1, the system 100 includes UE 122 and UE 120. In this example, the UE 122 and the UE 120 are illustrated as smartphones (e.g, handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 122 and/or the UE 120 may be IoT UEs, which may comprise a network access layer designed for low power IoT applications utilizing short-lived UE connections. An IoT UE, can utilize technologies such as NUM or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 122 and UE 120 may be configured to connect, for example, communicatively couple, with an access node or radio access node (shown as (R)AN 108). In embodiments, the (R)AN 108 may be an NG RAN or a SG RAN, an E-UTRAN, or a legacy RAN, such as a UTRAN or GERAN As used herein, the term "NG RAN" or the like may refer to a (R)AN 108 that operates in an NR or SG system, and the term "E-UTRAN" or the like may refer to a (R)AN 108 that operates in an LTE or 4G system. The UE 122 and UE 120 utilize connections (or channels) (shown as connection 104 and connection 102, respectively), each of which comprises a physical communications interface or layer (discussed in further detail below).

In this example, the connection 104 and connection 102 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, an NR protocol, and/or any of the other communications protocols discussed herein. In embodiments, the UE 122 and UE 120 may directly exchange communication data via a ProSe interface 110. The ProSe interface 110 may alternatively be referred to as a sidelink (SL) interface 110 and may comprise one or more logical channels, including but not limited to a PSCCH, a PSSCH, a PSDCH, and a PSBCH.

The UE 120 is shown to be configured to access an AP 112 (also referred to as "WLAN node," "WLAN," "WLAN Termination," "WT" or the like) via connection 124. The connection 124 can comprise a local wireless connection, such as a connection consistent with any IEEE 802.11 protocol, wherein the AP 112 would comprise a wireless fidelity (Wi-Fi®) router. In this example, the AP 112 may be connected to the Internet without connecting to the core network of the wireless system (described in further detail below). In various embodiments, the UE 120, (R)AN 108, and AP 112 may be configured to utilize LWA operation and/or LWIP operation. The LWA operation may involve the UE 120 in RRC_CONNECTED being configured by the RAN node 114 or the RAN node 116 to utilize radio resources of LTE and WLAN. LWIP operation may involve the UE 120 using WLAN radio resources (e.g., connection 124) via IPsec protocol tunneling to authenticate and encrypt packets (e.g., IP packets) sent over the connection 124 IPsec tunneling may include encapsulating the entirety of original IP packets and adding a new packet header, thereby protecting the original header of the IP packets.

The (R)AN 108 can include one or more AN nodes, such as RAN node 114 and RAN node 116, that enable the connection 104 and connection 102. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 100 (e.g., an eNB). According to various embodiments, the RAN node 114 or RAN node 116 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 114 or RAN node 116 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 114 or RAN node 116); a MAC/PHY split wherein RRC, PDCP, RLC, and MAC layers are operated by the CRAN/vBBUP and the PHY layer is operated by individual RAN nodes (e.g., RAN node 114 or RAN node 116); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 114 or RAN node 116 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the (R)AN 108 (not shown) or by a server pool in a similar manner as the CRAN/vBBUP. Additionally, or alternatively, one or more of the RAN node 114 or RAN node 116 may be next generation eNBs (ng-eNBs), which are RAN nodes that provide E-UTRA user plane and control plane protocol terminations toward the UE 122 and UE 120, and are connected to an SGC via an NG interface (discussed infra). In V2X scenarios one or more of the RAN node 114 or RAN node 116 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 114 and/or the RAN node 116 can terminate the air interface protocol and can be the first point of contact for the UE 122 and UE 120. In some embodiments, the RAN node 114 and/or the RAN node 116 can fulfill various logical functions for the (R)AN 108 including, but not limited to, radio network controller (RNC) functions such as radio bearer management, uplink and downlink dynamic radio resource management and data packet scheduling, and mobility management.

In embodiments, the UE 122 and UE 120 can be configured to communicate using OFDM communication signals with each other or with the RAN node 114 and/or the RAN node 116 over a multicarrier communication channel in accordance with various communication techniques, such as, but not limited to, an OFDMA communication technique (e.g., for downlink communications) or a SC-TDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 114 and/or the RAN node 116 to the UE 122 and UE 120, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 122 and UE 120 and the RAN node 114 and/or the RAN node 116 communicate data (for example, transmit and receive) over a licensed medium (also referred to as the "licensed spectrum" and/or the "licensed hand") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 122 and UE 120 and the RAN node 114 or RAN node 116 may operate using LAA, eLAA, and/or feLAA mechanisms. In these implementations, the UE 122 and UE 120 and the RAN node 114 or RAN node 116 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol, LBT is a mechanism whereby equipment (for example, UE 122 and UE 120, RAN node 114 or RAN node 116, etc.) senses a medium (for example, a channel or carrier frequency) and transmits when the medium is sensed to be idle (or when a specific channel in the medium is sensed to be unoccupied). The medium sensing operation may include clear channel assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 122, AP 112, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 122 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 122 and UE 120. The PDCCH carries information about the transport format and resource allocations related to the PDSCH channel, among other things. It may also inform the UE 122 and UE 120 about the transport format, resource allocation, and HARQ information related to the uplink shared channel. Typically, downlink scheduling (assigning control and shared channel resource blocks to the UE 120 within a cell) may be performed at any of the RAN node 114 or RAN node 116 based on channel quality information fed back from any of the UE 122 and UE 120. The downlink resource assignment information may be sent on the PDCCH used for (e.g., assigned to) each of the UE 122 and UE 120.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level. L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 114 or RAN node 116 may be configured to communicate with one another via interface 130. In embodiments where the system 100 is an LTE system (e.g., when CN 106 is an EPC),the interface 130 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C), The X2-U may provide flow control mechanisms for user data packets transferred over the X2 interface, and may be used to communicate information about the delivery of user data between eNBs. For example, the X2-U may provide specific sequence number information for user data transferred from a McNB to an SeNB; information about successful in sequence delivery of PDCP PDUs to a UE 122 from an SeNB for user data; information of PDCP PDUs that were not delivered to a UE 122, information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a SG or NR system (e.g., when CN 106 is an SGC), the interface 130 may be an Xn interface. The Xn interface is defined between two or more RAN nodes (e.g., two or more gNBs and the like) that connect to SGC, between a RAN node 114 (e.g., a gNB) connecting to SGC and an eNB, and/or between two cNBs connecting to 5GC (e.g., CN 106). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 122 in a connected mode (e.g., CM-CONNECTED) including functionality to manage the UE mobility for connected mode between one or more RAN node 114 or RAN node 116. The mobility support may include context transfer from an old (source) serving RAN node 114 to new (target) serving RAN node 116; and control of user plane tunnels between old (source) serving RAN node 114 to new (target) serving RAN node 116. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 108 is shown to be communicatively coupled to a core network-in this embodiment, CN 106. The CN 106 may comprise one or more network elements 132, which are configured to offer various data and telecommunications services to customers/subscribers (e.g., users of UE 122 and UE 120) who are connected to the CN 106 via the (R)AN 108. The components of the CN 106 may be implemented in one physical node or separate physical nodes including components to read and execute instructions from a machine-readable or computer-readable medium (e.g., a non-transitory machine-readable storage medium). In sonic embodiments, NFV may be utilized to virtualize any or all of the above-described network node functions via executable instructions stored in one or more computer-readable storage mediums (described in further detail below). A logical instantiation of the CN 106 may be referred to as a network slice, and a logical instantiation of a portion of the CN 106 may be referred to as a network sub-slice. MN architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 118 may be an element offering applications that use IP bearer resources with the core network (e.g., UMTS PS domain, LTE PS data services, etc.). The application server 118 can also be configured to support one or more communication services (e.g., VoIP sessions, PTT sessions, group communication sessions, social networking services, etc.) for the UE 122 and UE 120 via the EPC. The application server 118 may communicate with the CN 106 through an IP communications interface 136.

In embodiments, the CN 106 may be an SGC, and the (R)AN 116 may be connected with the CN 106 via an NG interface 134. In embodiments, the NG interface 134 may be split into two parts, an NG user plane (NG-U) interface 126, which carries traffic data between the RAN node 114 or RAN node 116 and a UPF, and the S1 control plane (NG-C) interface 128, which is a signaling interface between the RAN node 114 or RAN node 116 and AMFs.

In embodiments, the CN 106 may be a SG CN, while in other embodiments, the CN 106 may be an EPC). Where CN 106 is an EPC, the (R)AN 116 may be connected with the CN 106 via an S1 interface 134. In embodiments, the S1 interface 134 may be split into two parts, an S1 user plane (S1-U) interface 126, which carries traffic data between the RAN node 114 or RAN node 116 and the S-GW, and the S1-MME interface 128, which is a signaling interface between the RAN node 114 or RAN node 116 and MMES.

Figure 2:
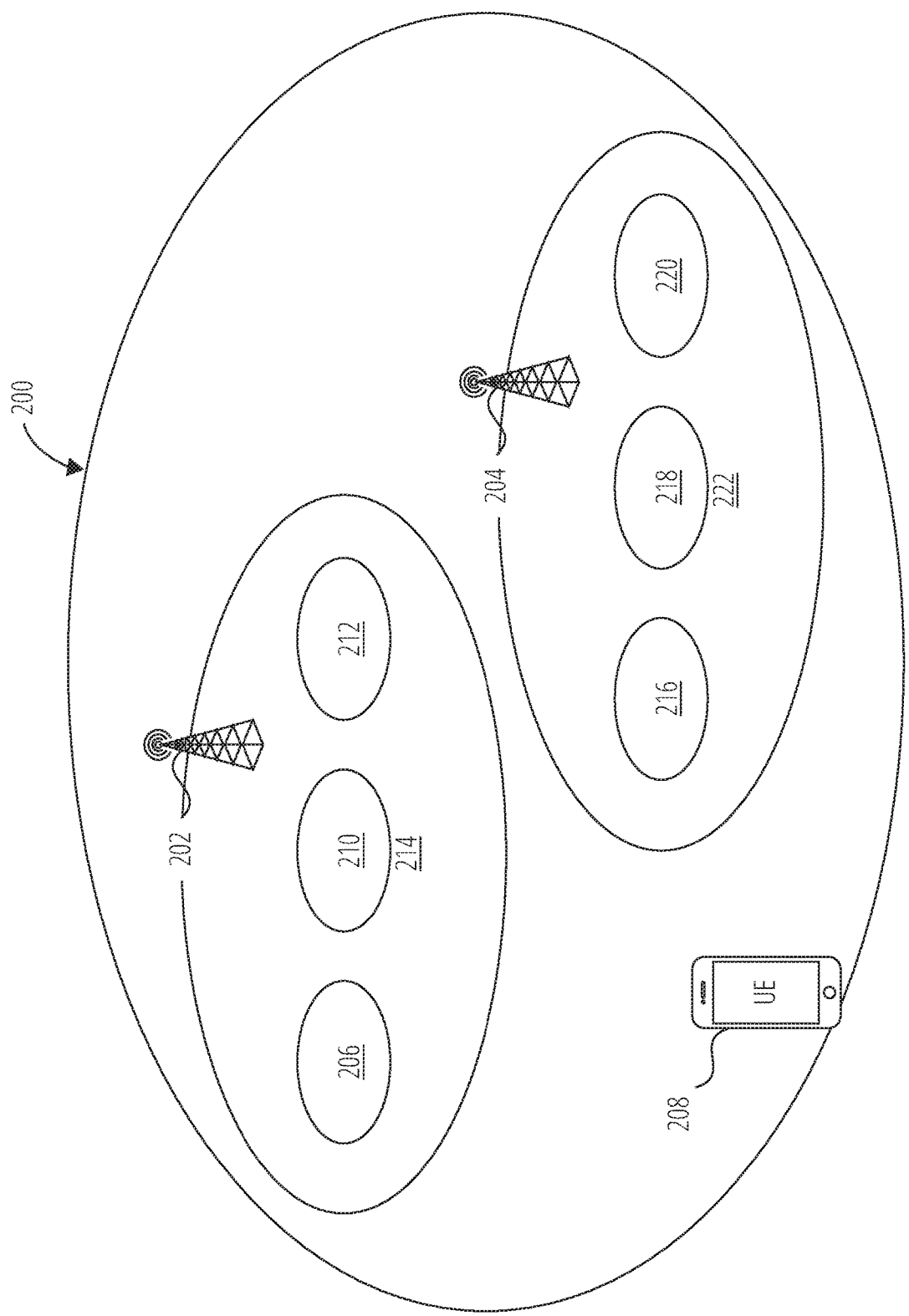
FIG. 2 illustrates a network in accordance with one embodiment.

FIG. 2 shows examples of Multi-RAT Dual Connectivity (MR-DC), which may involve a multiple reception (Rx)/transmission (Tx) UE that may be configured to utilize radio resources provided by two distinct schedulers in two different nodes connected via non-ideal backhaul, one providing Evolved Universal Terrestrial Radio Access (E-UTRA) access and the other one providing NR access. One scheduler is located in a Master Node (MN) and the other in the Secondary Node (SN). The MN and SN are connected via a network interface and at least the MN is connected to the core network.

MR-DC may include, but is not limited to, E-UTRA-NR Dual Connectivity (EN-DC), NG-RAN-E-UTRA-NR Dual Connectivity (NGEN-DC), NR-E-UTRA Dual Connectivity (NE-DC), and NR-DC. In an EN-DC network or communication, a UE may be connected to one evolved NodeB (eNB) or ng-eNB that acts as an MN and one next generation NodeB (gNB) that acts as an SN. The eNB or ng-eNB is connected to an evolved packet core (EPC) and the eNB is connected to the eNB. The gNB may be a node that provides new radio (NR) user-plane and control-plane protocol terminations towards the UE, and acts as the SN in EN-DC. In an NE-DC network or communication, by contrast, a UE may be connected to one gNB that acts as an MN and one eNB or ng-eNB that acts as an SN. The gNB is connected to 5G Core (5GC) and the eNB or ng-eNB is connected to the gNB via the Xn interface. In NR-DC, both the master and secondary RAN nodes are 5G gNBs.

FIG. 2 shows an example network 200 that, in some embodiments, is configured as an EN-DC network. The network 200 may include multiple ANs, for example, AN 202 and AN 204. The AN 202 and AN 204 may be the same or substantially similar to the RAN node 114 or RAN node 116 shown in in FIG. 1. The AN 202 may provide or be associated with a Primary Serving Cell (PCell) PCell 206 of the UE 208, with which the UE 218 may either perform the initial connection establishment procedure or initiate the connection re-establishment procedure. The AN 204 may provide or be associated with one or more Secondary Cells (SCells).

In some embodiments, the AN 202 may further provide or be associated with one or more Secondary Cells (SCells), e.g., SCell 210 and SCell 212, of the UE 208. The PCell 206 and SCell 210/SCell 212 may be part of a Master Cell Group (MCG) MCG 214.

In some embodiments, the one or more SCells may include a Primary Secondary Cell (PSCell) PSCell 216 and one or more SCells, e.g., SCell 218 and SCell 220. The PSCell 216 and SCell 218/SCell 220 may be part of a Secondary Cell Group (SCG) SCG 222.

Note that "AN of the PCell," "AN in the PCell," and "PCell" are used interchangeably throughout the disclosure herein, as well as regarding the terms of PSCell, SCell, etc.

In the EN-DC network 200, the AN 202 may be an eNB and the AN 204 may be a gNB. In accordance, the PCell 206, SCell 210, and SCell 212 may be LTE cells and the PSCell 216, SCell 218, SCell 220 may be NR cells. Conversely, when FIG. 2 represents an example network 200 that, in some embodiments, is configured as an NE-DC network, the AN 202 may be a gNB and the AN 204 may be an eNB. In accordance, the PCell 206, SCell 210, and SCell 212 may be NR cells and the PSCell 216, SCell 218, SCell 220 may be LTE cells.

In a network that operates either in an EN-DC or NE-DC mode to the UE 208, the UE 208 may be required to detect or measure one or more neighboring non-serving cells or some other measurements, upon configurations from the PCell 206. Aspects of measurement and measurement configuration are described in 3GPP TS 38.331. For instance, the network may configure an RRC_CONNECTED UE to perform measurements. The network may configure the UE, to report them in accordance with the measurement configuration or perform conditional reconfiguration evaluation in accordance with the conditional reconfiguration. The measurement configuration is provided by means of dedicated signaling i.e. using the RRCReconfiguration or RRCResume. The PCell 206 configure relevant measurement information for the UE 208, such as corresponding SSB-based Measurement Timing Configuration (SMTC) window and measurement gap set based on the timing of Synchronization Signal Block (SSB) transmission for the target cell being measured.

As described in Pub, No. US2019/0230550 A1 of Yiu (assigned to Apple, Inc.), a measurement object (MO) can include a list of cells (and their frequencies of operation) on which measurements are to be performed by a UE. For example, a UE can perform a measurement based on a synchronization signal block (SSB) or a channel state information reference signal (CSI-RS) of neighboring cells based on a network configuration. In one example, multiple MOs can be configured for a same carrier frequency.

Pub. No, CN1104475281 of Cui et al., which claims priority to U.S. Provisional Patent Application No. 62/670,639 (both of which are assigned to Apple, Inc.), describes MO merging in conventional dual connectivity systems. Moreover, in legacy EN-DC or NR-DC, the merging rule of MOs for NR licensed carrier is specified in 3GPP TS 38.133. Considering NR-DC as an example, when NR PCell and NR PSCell configures the same NR carrier frequency layer to be monitored by the UE in NR-DC, this layer is counted only once to the total number of effective carrier frequency layers provided that the SFN-s and slot boundaries are aligned, unless the configured NR carrier frequency layers to be monitored have: different RSSI measurement resources; different deriveSSB-IndexFromCell indications; or different SMTC configurations.

For NR unlicensed spectrums, however, the MO merging rule and mechanism of certain MOs for NR-U carriers is unclear with respect to current UE implementations and network expectations. For example, the following five scenarios are considered in the network deployment: A first scenario is a carrier aggregation between licensed band NR (PCell) and NR-U (SCell), and the NR-U SCell may have both DL and UL, or DL only. A second scenario is dual connectivity between licensed band LTE (PCell) and NR-U (PSCell). A third scenario is a stand-alone NR-U. A fourth scenario is a stand-alone NR cell in unlicensed band and UL in licensed band. A fifth scenario is dual connectivity between licensed band NR and NR-U. In the second or fifth scenarios, legacy EN-DC, or legacy NR-DC, the MN and SN may configure two measurement objects respectively with the same NR unlicensed carrier frequency layer (carrier with CCA) to be measured by the UE for Reference Signal Receive Power (RSRP) and/or Reference Signal Received Quality (RSRQ) and/or Signal-to-Noise Ratio (SINR) and/or Received Signal Strength Indicator (RSSI) and/or channel occupancy (CO).

In contrast to the merging rule of MOs for NR licensed carrier specified in 3GPP TS 38.133, the MO of NR unlicensed carrier includes new parameters in the configuration. Accordingly, this disclosure defines new techniques for the NR-U MO merging with consideration of those new parameters.

According to a first embodiment. NR-U MO merging is configured for RSRP/RSRQ/SINR/RSSI/CO measurement in EN-DC or the second scenario mentioned above in which dual connectivity between licensed band LTE (PCell) and NR-U (PSCell). When the E-UTRA PCell and NR PSCell configures the same NR carrier frequency layer with CCA to be monitored by the UE in synchronous intra-band EN-DC, this layer shall be counted only once to the total number of effective carrier frequency layers provided that the SEN-s and slot boundaries are aligned, unless the configured NR carrier frequency layers with CCA (i.e., NR-U carrier frequency layers) to be monitored have: different RSSI measurement resources; different deriveSSB-IndexFromCell indications; different SMTC configurations; different Q values (explained in the following paragraph); or different RSSI Measurement Timing Configuration (RMTC) configurations.

Q value is used to indicate the Quasi-Colocation (QCL) relationship between SSB positions on the frequency indicated by ssbFrequency. In some embodiments, the Q value could be represented by SSB-PositionQCL-Relation-r16 parameter of an NR carrier frequency layer with CCA, or the Q value could be represented by SSB-PositionQCL-CellsToAddModList-r16 parameter of an NR carrier frequency layer with CCA. The signaling of these parameters is described in 3GPP TS 38.331. Similarly, RMTC configuration could be represented by an RMTC-Config-r16 parameter of an NR carrier frequency layer with CCA, The signaling of this parameters is also described in 3GPP TS 38.331.

The NR PSCell could be a licensed PScell (without CCA) or an NR-U PSCell (with CCA). In other words, there are two variants. First, the UE is operating on intra-band LTE PCell and NR licensed PSCell (without CCA), and LTE PCell and NR licensed PSCell configured a same NR-U carrier (with CCA) to UE for measurement. Second, the UE is operating on intra-band LTE PCell and NMI PSCell (with CCA), and LTE PCell and NR-U PSCell configured a same NR-U carrier (with CCA) to UE for measurement.

According to a second embodiment, NR-U MO merging is configured for RSRP/RSRQ/SINR/RSSI/CO measurement in NR-DC or the fifth scenario mentioned above in which dual connectivity is between licensed band NR and NR-U. When NR PCell and NR PSCell (this NR PSCell could be licensed PSCell (without CCA) or NR-U PSCell (with CCA), as noted above) configures the same NR carrier frequency layer with CCA to be monitored by the UE in synchronous NR-DC, this layer shall be counted only once to the total number of effective carrier frequency layers provided that the SFN-s and slot boundaries are aligned, unless the configured NR carrier frequency layers with CCA (i.e., NR-U carrier frequency layers) to be monitored have: different RSSI measurement resources; different deriveSSB-IndexFromCell indications; different SMTC configurations; different Q values; or different RMTC configurations.

In this embodiment, the Q value could also be represented by SSB-PositionQCL-Relation-r16 parameter of an NR carrier frequency layer with CCA (signaling description in TS 38.331), or the Q value could be represented by SSB-PositionQCL-CellsToAddModList-r16 parameter of an NR carrier frequency layer with CCA (signaling description in TS 38.331). RMTC configuration could be represented by an RMTC-Config-r16 parameter of an NR carrier frequency layer with CCA (signaling description in TS 38.331).

In some embodiments, network components (e.g., a gNB) and a UE use the same, above-described criteria to determine if the MO could be merged. After merging, the UE will send one measurement report to network for what would have been two MOs. From network side, the gNB will expect a merged MO measurement result will be reported in a single MO report. To determine that the MO is merged, the PSCell will send the MO configuration package (e.g., Q value and RMTC configuration) to PCell (the coordination between PSCell and PCell via Xn interface or via proprietary interface), and then PCell have the Q configuration and other criteria information of the MO in PSCell. In another embodiment, the UE would indicate two MO IDs in one single measurement report with same measurement results, and then network would understand this measurement is a merged MO measurement report.

Figure 3:
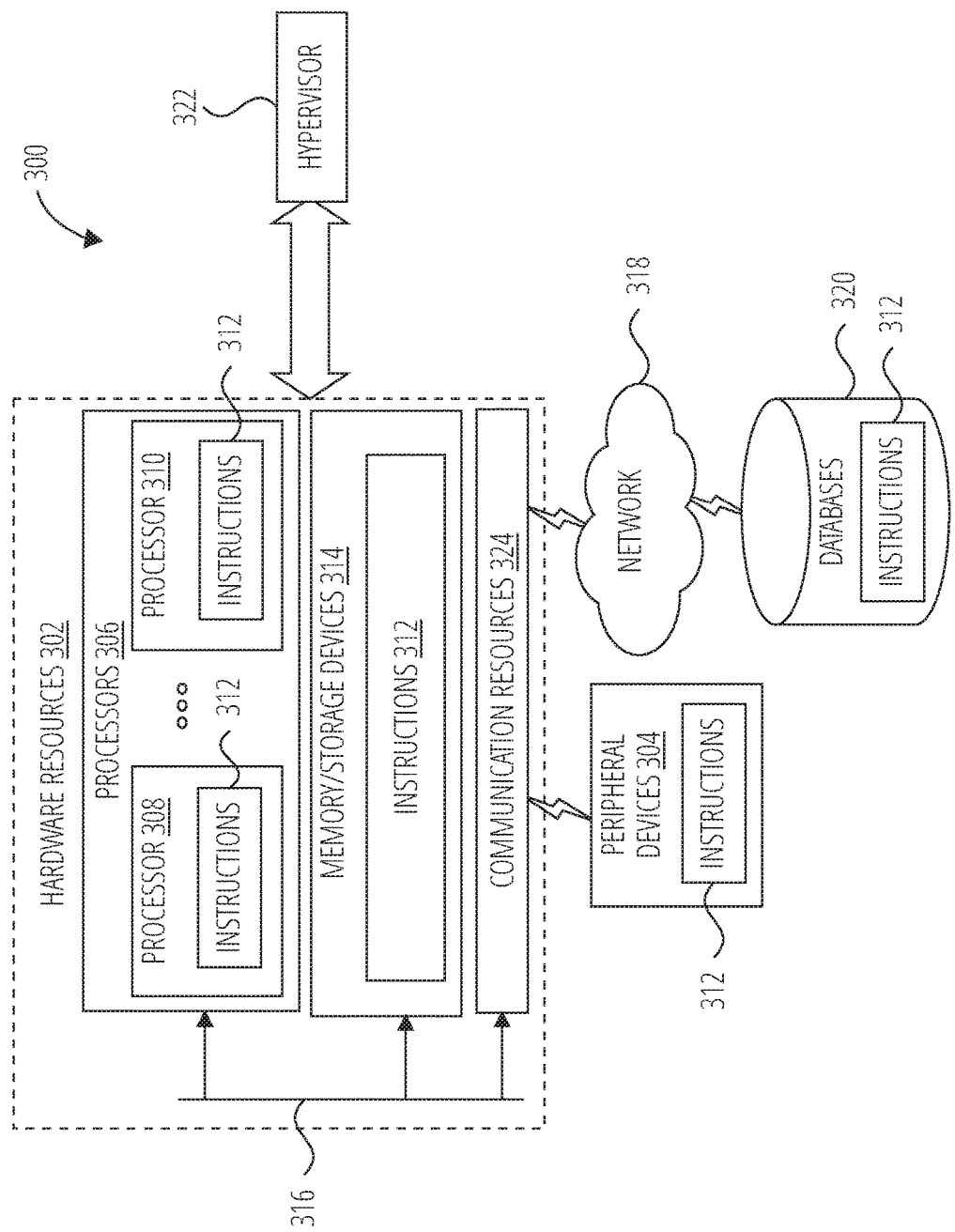
FIG. 3 illustrates components in accordance with one embodiment.

FIG. 3 is a block diagram illustrating components 300, according to some example embodiments, able to read instructions from a machine-readable or computer-readable medium (e.g., a non-transitory machine-readable storage medium) and perform any one or more of the methodologies discussed herein. Specifically, FIG. 3 shows a diagrammatic representation of hardware resources 302 including one or more processors 306 (or processor cores), one or more memory/storage devices 314, and one or more communication resources 324, each of which may be communicatively coupled via a bus 316. For embodiments where node virtualization (e.g., NFV) is utilized, a hypervisor 322 may be executed to provide an execution environment for one or more network slices/sub-slices to utilize the hardware resources 302.

The processors 306 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 308 and a processor 310.

The memory/storage devices 314 may include main memory, disk storage, or any suitable combination thereof. The memory/storage devices 314 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 324 may include interconnection or network interface components or other suitable devices to communicate with one or more peripheral devices 304 or one or more databases 320 via a network 318. For example, the communication resources 324 may include wired communication components e.g., for coupling via a Universal Serial Bus (USB)), cellular communication components, NFC components, Bluetooth® components (e.g., Bluetooth® Low Energy), Wi-Fi® components, and other communication components.

Instructions 312 may comprise software, a program, an application, an applet, an app, or other executable code for causing at least any of the processors 306 to perform any one or more of the methods discussed herein. The instructions 312 may reside, completely or partially, within at least one of the processors 306 within the processor's cache memory), the memory/storage devices 314, or any suitable combination thereof. Furthermore, any portion of the instructions 312 may be transferred to the hardware resources 302 from any combination of the peripheral devices 304 or the databases 320. Accordingly, the memory of the processors 306, the memory/storage devices 314, the peripheral devices 304, and the databases 320 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method, performed by a user equipment (UE), for merging measurement objects (MOs) in a New Radio (NR) system including NR unlicensed (NR-U) carriers configured to provide E-UTRA-NR Dual Connectivity (EN-DC) between a licensed band LTE Primary Cell (PCell) and an NR-U Primary Secondary Cell (PSCell), the method comprising: determining whether an E-UTRA PCell and an NR PSCell configure a same NR carrier frequency layer with clear channel assessment (CCA) to be monitored by the UE in synchronous infra-band EN-DC; and counting the same NR carrier frequency layer once to a total number of effective carrier frequency layers by checking that system frame numbers and slot boundaries are aligned and in response to the same NR carrier frequency layer having no differences in RSSI measurement resources, deriveSSB-IndexFromCell indications, SMTC configurations, Q values, and RSSI Measurement Timing Configuration (RMTC) configurations.

Example 2 is the method of Example 1 in which the NR PSCell is a licensed PSCell without CCA.

Example 3 is the method of Example 1 in which the NR PSCell is an NR-U PSCell with CCA.

Example 4 is the method of Example 1 in which the Q value is represented by an SSB-PositionQCL-Relation-r16 parameter.

Example 5 is the method of Example 1 which the Q value is represented by an SSB-PositionQCL-CellsToAddMod-List-r16 parameter.

Example 6 is the method of Example 1 in which the RMTC configuration is represented by an RMTC-Config-r16 parameter of an NR unlicensed carrier frequency layer.

Example 7 is a method, performed by a user equipment (UE), for merging measurement objects (MOs) in a New Radio (NR) system including NR unlicensed (NR-U) carriers configured to provide NR Dual Connectivity (NR-DC) between a licensed band NR and an NR-U, the method comprising: determining whether an NR Primary Cell (PCell) and an NR Primary Secondary Cell (PSCell) configure a same NR carrier frequency layer with clear channel assessment (CCA) to be monitored by the UE in synchronous NR-DC; and counting the same NR carrier frequency layer once to a total number of effective carrier frequency layers by checking that system frame numbers and slot boundaries are aligned and in response to the same NR carrier frequency layer having no differences in RSSI measurement resources, deriveSSB-IndexFromCell indications, SMTC configurations, Q values, and RSSI Measurement Timing Configuration (RMTC) configurations.

Example 8 is the method of Example 7 in which the NR PSCell is a licensed PSCell without CCA.

Example 9 is the method of Example 7 in which the NR PSCell is an NR-U PSCell with CCA.

Example 10 is the method of Example 7 in which the Q value is represented by an SSB-PositionQCL-Relation-r16 parameter.

Example 11 is the method of Example 7 in which the Q value is represented by an SSB-PositionQCL-CellsToAddModList-r16 parameter.

Example 12 is the method of Example 7 in which the RMTC configuration is represented by an RMTC-Config-r16 parameter of an NR carrier frequency layer.

Example 13 is a method, performed by apparatus of a New Radio (NR) system configured to provide NR unlicensed (NR-U) carriers for E-UTRA NR Dual Connectivity (EN-DC) or dual connectivity between a licensed band LTE Primary Cell (PCell) and an NR-U Primary Secondary Cell (PSCell), for measurement object (MO) configuration of a user equipment (UE), the method comprising: configuring an MO for the UE, wherein the MO is associated with an NR carrier frequency layer with clear channel assessment (CCA) to be monitored by the UE in synchronous intra-band EN-DC; and determining that the MO is merged with another NR carrier frequency layer for which its system frame numbers and slot boundaries are aligned with the NR carrier frequency layer and having no differences in RSSI measurement resources, deriveSSB-IndexFromCell indications, SMTC configurations, Q values, and RSSI Measurement Timing Configuration (RMTC) configurations.

Example 14 is the method of Example 13 receiving a merged MO measurement result as a single MO report associated with two or more NR carrier frequency layers.

Example 15 is the method of Example 13 further comprising establishing an NR PSCell that is a licensed PSCell without CCA.

Example 16 is the method of Example 13 further comprising establishing an NR PSCell that is an NR-U PSCell with CCA.

Example 17 is the method of Example 13 in which the Q value is represented by an SSB-PositionQCL-Relation-r16 parameter.

Example 18 is the method of Example 13 in which the Q value is represented by an SSB-PositionQCL-CellsToAddModList-r16 parameter.

Example 19 is the method of Example 13 in which the RMTC configuration is represented by an RMTC-Config-r16 parameter of an NR unlicensed carrier frequency layer.

Example 20 is a method, performed by apparatus of a New Radio (NR) system including NR unlicensed (NR-U) carriers configured to provide NR Dual Connectivity (NR-DC) or dual connectivity between a licensed band NR and an NR-U, for measurement object (MO) configuration of a user equipment (UE), the method comprising: configuring an MO for the UE, wherein the MO is associated with an NR carrier frequency layer with clear channel assessment (CCA) to be monitored by the UE in synchronous NR-DC; and determining that the MO is merged with another NR carrier frequency layer for which its system frame numbers and slot boundaries are aligned with the NR carrier frequency layer and having no differences in RSSI measurement resources, deriveSSB-IndexFromCell indications, SMTC configurations, Q values, and RSSI Measurement Timing Configuration (RMTC) configurations.

Example 21 is the method of Example 20 receiving a merged MO measurement result as a single MO report associated with two or more NR carrier frequency layers.

Example 22 is the method of Example 20 further comprising establishing an NR PSCell that is a licensed PSCell without CCA.

Example 23 is the method of Example 20 further comprising establishing an NR PSCell that is an NR-U PSCell with CCA.

Example 24 is the method of Example 20 in which the Q value is represented by an SSB-PositionQCL-Relation-r16 parameter.

Example 25 is the method of Example 20 in which the Q value is represented by an SSB-PositionQCL-CellsToAdd-ModList-r16 parameter.

Example 26 is the method of Example 20 in which the RMTC configuration is represented by an RMTC-Config-r16 parameter of an NR unlicensed carrier frequency layer.

Example 27 is a non-transitory computer-readable storage medium of a user equipment (UE) configured to merge measurement objects (MOs) in a New Radio (NR) system including NR unlicensed (NR-U) carriers configured to provide E-UTRA-NR Dual Connectivity (EN-DC) between a licensed band LTE Primary Cell (PCell) and an NR-U Primary Secondary Cell (PSCell), the computer-readable storage medium including instructions that when executed by a computer, cause the computer to: determine whether an E-UTRA PCell and an NR PSCell configure a same NR carrier frequency layer with clear channel assessment (CCA) to be monitored by the UE in synchronous intra-band EN-DC; and count the same NR carrier frequency layer once to a total number of effective carrier frequency layers by checking that system frame numbers and slot boundaries are aligned and in response to the same NR carrier frequency layer having no differences in RSSI measurement resources, deriveSSB-IndexFromCell indications, SMTC configurations, Q values, and RSSI Measurement Timing Configuration (RMTC) configurations.

Example 28 is the computer-readable storage medium of Example 27 in which the NR PSCell is a licensed PSCell without CCA.

Example 29 is the computer-readable storage medium of Example 27 in which the NR PSCell is an NR-U PSCell with CCA.

Example 30 is the computer-readable storage medium of Example 27 in which the Q value is represented by an SSB-PositionQCL-Relation-r16 parameter.

Example 31 is the computer-readable storage medium of Example 27 in which the Q value is represented by an SSB-PositionQCL-CellsToAddModList-r16 parameter.

Example 32 is the computer-readable storage medium of Example 27 in which the RMTC configuration is represented by an RMTC-Config-r16 parameter of an NR unlicensed carrier frequency layer.

Example 33 is a non-transitory computer-readable storage medium of a user equipment (UE) configured to merge measurement objects (MOs) in a New Radio (NR) system including NR unlicensed (NR-U) carriers configured to provide NR Dual Connectivity (NR-DC) between a licensed band NR and an NR-U, the method, the computer-readable storage medium including instructions that when executed by a computer, cause the computer to: determine whether an NR Primary Cell (PCell) and an NR Primary Secondary Cell (PSCell) configure a same NR carrier frequency layer with clear channel assessment (CCA) to be monitored by the UE in synchronous NR-DC; and count the same NR carrier frequency layer once to a total number of effective carrier frequency layers by checking that system frame numbers and slot boundaries are aligned and in response to the same NR carrier frequency layer having no differences in RSSI measurement resources, deriveSSB-IndexFromCell indications, SMTC configurations, Q values, and RSSI Measurement Timing Configuration (RMTC) configurations.

Example 34 is the computer-readable storage medium of Example 33 in which the NR PSCell is a licensed PSCell without CCA.

Example 35 is the computer-readable storage medium of Example 33 in which the NR PSCell is an NR-U PSCell with CCA.

Example 36 is the computer-readable storage medium of Example 33 in which the Q value is represented by an SSB-PositionQCL-Relation-r16 parameter.

Example 37 is the computer-readable storage medium of Example 33 in which the Q value is represented by an SSB-PositionQCL-CellsToAddModList-r16 parameter.

Example 38 is the computer-readable storage medium of Example 33 in which the RMTC configuration is represented by an RMTC-Config-r16 parameter of an NR carrier frequency layer.

Example 39 may include an apparatus comprising means to perform one or more elements of a method described in or related to any of the above Examples, or any other method or process described herein.

Example 40 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 41 may include an apparatus comprising logic, modules, or circuitry to perform one or more elements of a method described in or related to any of the above Examples, or any other method or process described herein.

Example 42 may include a method, technique, or process as described in or related to any of the above Examples, or portions or parts thereof.

Example 43 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 44 may include a signal as described in or related to any of the above Examples, or portions or parts thereof.

Example 45 may include a datagram, packet, frame, segment, protocol data unit (PDU), or message as described in or related to any of the above Examples, or portions or parts thereof, or otherwise described in the present disclosure.

Example 46 may include a signal encoded with data as described in or related to any of the above Examples, or portions or parts thereof, or otherwise described in the present disclosure.

Example 47 may include a signal encoded with a datagram, packet, frame, segment, PDU, or message as described in or related to any of the above Examples, or portions or parts thereof, or otherwise described in the present disclosure.

Example 48 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 49 may include a computer program comprising instructions, wherein execution of the program by a processing element is to cause the processing element to carry out the method, techniques, or process as described in or related to any of the above Examples, or portions thereof.

Example 50 may include a signal in a wireless network as shown and described herein.

Example 51 may include a method of communicating in a wireless network as shown and described herein.

Example 52 may include a system for providing wireless communication as shown and described herein.

Example 53 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc, of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users, Although the foregoing has been described in some detail for purposes of clarity, it will be apparent that certain changes and modifications may be made without departing from the principles thereof, it should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended

The invention claimed is:

1. A method, performed by a user equipment (UE), for merging measurement objects (MOs) in a New Radio (NR) system including NR unlicensed (NR-U) carriers configured to provide E-UTRA-NR Dual Connectivity (EN-DC) between a licensed band LTE Primary Cell (PCell) and an NR-U Primary Secondary Cell (PSCell), the method comprising:
   determining whether an E-UTRA PCell and an NR PSCell configure a same NR carrier frequency layer with clear channel assessment (CCA) to be monitored by the UE in synchronous intra-band EN-DC, wherein the NR PSCell is an NR-U PSCell with CCA and the E-UTRA PCell is a licensed band LTE PCell; and
   merging MOs for the same NR carrier frequency layer configured by the NR-U PSCell with CCA and the licensed band LTE PCell by:
      counting the same NR carrier frequency layer once to a total number of effective carrier frequency layers by checking that system frame numbers and slot boundaries are aligned and in response to the same NR carrier frequency layer having no differences in RSSI measurement resources, deriveSSB-IndexFromCell indications, SMTC configurations, Q values, and RSSI Measurement Timing Configuration (RMTC) configurations,
      wherein the Q values indicate the Quasi-Colocation (QCL) relationship between Synchronization Signal Block (SSB) positions on a frequency indicated by ssbFrequency;
      wherein for the MOs of the same NR carrier frequency layer configured by the NR-U PSCell with CCA and the licensed band LTE PCell to be merged, the RMTC and the Q values must be the same.

2. The method of claim 1 in which the Q value is represented by an SSB-PositionQCL-Relation-r16 parameter.

3. The method of claim 1 in which the Q value is represented by an SSB-PositionQCL-CellsToAddModList-r16 parameter.

4. The method of claim 1 in which the RMTC configuration is represented by an RMTC-Config-r16 parameter of an NR unlicensed carrier frequency layer.

5. A method, performed by a user equipment (UE), for merging measurement objects (MOs) in a New Radio (NR) system including NR unlicensed (NR-U) carriers configured to provide NR Dual Connectivity (NR-DC) between a licensed band NR and an NR-U, the method comprising:
   determining whether an NR Primary Cell (PCell) and an NR Primary Secondary Cell (PSCell) configure a same NR carrier frequency layer with clear channel assessment (CCA) to be monitored by the UE in synchronous NR-DC, wherein the NR PSCell is an NR-UPSCell with CCA and the NR PCell is a licensed band NR PCell; and
   merging MOs for the same NR carrier frequency layer configured by the NR-U PSCell with CCA and the licensed band NR PCell by:
      counting the same NR carrier frequency layer once to a total number of effective carrier frequency layers by checking that system frame numbers and slot boundaries are aligned and in response to the same NR carrier frequency layer having no differences in RSSI measurement resources, deriveSSB-IndexFromCell indications, SMTC configurations, Q values, and RSSI Measurement Timing Configuration (RMTC) configurations,
      wherein the Q values indicate the Quasi-Colocation (QCL) relationship between Synchronization Signal Block (SSB) positions on a frequency indicated by ssbFrequency;

wherein for the MOs of the same NR carrier frequency layer configured by the NR-UPSCell with CCA and the licensed band NR PCell to be merged, the RMTC and the Q values must be the same.

6. The method of claim 5 in which the Q value is represented by an SSB-PositionQCL-Relation-r16 parameter.

7. The method of claim 5 in which the Q value is represented by an SSB-PositionQCL-CellsToAddModList-r16 parameter.

8. The method of claim 5 in which the RMTC configuration is represented by an RMTC-Config-r16 parameter of an NR carrier frequency layer.

9. A method, performed by apparatus of a New Radio (NR) system configured to provide NR unlicensed (NR-U) carriers for E-UTRA NR Dual Connectivity (EN-DC) or dual connectivity between a licensed band LTE Primary Cell (PCell) and an NR-U Primary Secondary Cell (PSCell), for measurement object (MO) configuration of a user equipment (UE), the method comprising:

configuring an MO for the UE, wherein the MO is associated with an NR carrier frequency layer with clear channel assessment (CCA) to be monitored by the UE in synchronous intra-band EN-DC; and determining that the MO was merged with another MO at the UE for the same NR carrier frequency layer for which the MOs system frame numbers and slot boundaries are aligned with the NR carrier frequency layer and having no differences in RSSI measurement resources, deriveSSB-IndexFromCell indications, SMTC configurations, Q values, and RSSI Measurement Timing Configuration (RMTC) configurations, wherein the Q values indicate the Quasi-Colocation (QCL) relationship between Synchronization Signal Block (SSB) positions on a frequency indicated by ssbFrequency;

wherein for MOs of a same NR carrier frequency layer configured by the NR-UPSCell with CCA and the licensed band LTE PCell to be merged, the RMTC and the Q values must be the same.

10. The method of claim 9, further comprising receiving a merged MO measurement result as a single MO report associated with two or more NR carrier frequency layers.

11. The method of claim 9 in which the Q value is represented by an SSB-PositionQCL-Relation-r16 parameter.

12. The method of claim 9 in which the Q value is represented by an SSB-PositionQCL-CellsToAddModList-r16 parameter.

13. The method of claim 9 in which the RMTC configuration is represented by an RMTC-Config-r16 parameter of an NR unlicensed carrier frequency layer.

* * * * *